May 3, 1966  A. E. LUND  3,249,500
TERMITE ALLUREMENT
Filed Jan. 29, 1963
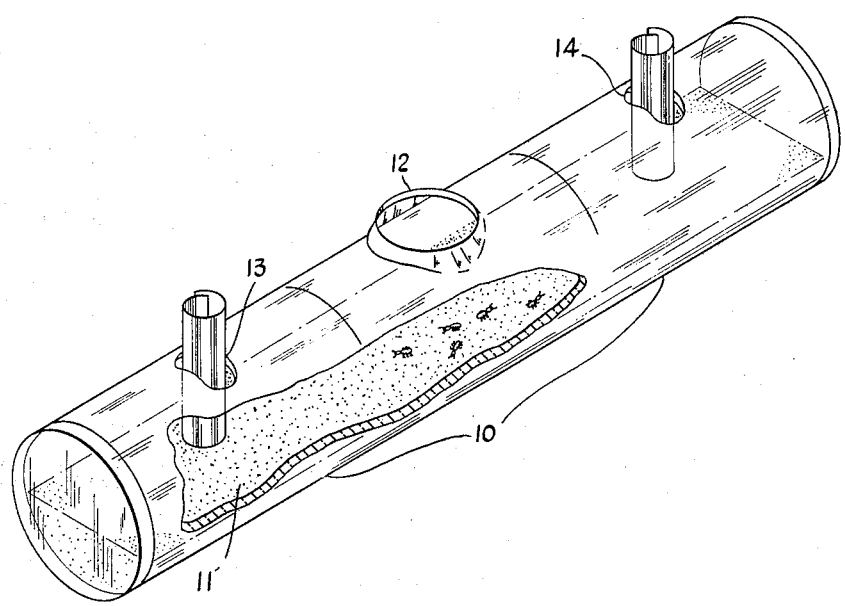
INVENTOR.
ANDERS E. LUND
BY
Oscar B Brumback
his Attorney 3,249,500
TERMITE ALLUREMENT
Anders E. Lund, Pitcairn, Pa., assignor to Koppers
Company, Inc., a corporation of Delaware
Filed Jan. 29, 1963, Ser. No. 254,629
4 Claims. (Cl. 167—48)

This invention relates generally to termiticides.

The measures generally employed to reduce termite damage are (a) the use of materials which are resistant to or not susceptible to termite attack, (b) the use of mechanical barriers, and (c) the use of chemical barriers. Chemical barriers have the advantage of insuring against penetration of the mechanical or resistant barriers because of faulty workmanship, materials or discontinuities in the barriers due to structural changes. The chemical barrier is provided by producing around and/or under the structure a layer of soil that is toxic or repellent to termites. The chemicals are usually applied as solutions in oil or water or as emulsions in water. Typical of the chemicals used to control termites are creosote, sodium arsenite, pentachlorophenol, sodium pentachlorophenate, copper naphthenate, dichlorodiphenyl trichlorethane, benzene hexachloride, lindane, chlordane, dieldrin and aldrin.

A chemical barrier, of course, has the disadvantage that the length of time that the chemicals remain effective depends upon a number of factors, such as, soil type, climate, exposure of the area to weather, and the kind of termite involved. A further disadvantage is that many of the chemicals are neutral insofar as attracting or repelling termites is concerned. So, a termite that contacts the chemical does so more by accident than by intent. The termite must actually contact and, in some cases, eat the chemical in order to be killed by it.

In accordance with this invention, there is provided a novel allurement which tempts the termites to their death. The allurement, in accordance with this invention, comprises an admixture of vanillin and a termiticide.

Vanillin has a pleasant aromatic odor and is widely used as a flavoring agent for ice cream, candies, cakes, cookies, soft drinks, and the like. In fact, it is probable that vanillin is the most widely used synthetic flavor in terms of quantities consumed.

Vanillin (vanillaldehyde, 4-hydroxy-3-methoxybenzaldehyde, protocatechualdehyde 3-methyl ether) has the general formula:

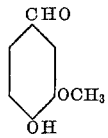

It occurs naturally in many plants, for example, vanilla pod, sugar beet, and the like. Commercially, vanillin is derived from lignin, which, in turn, may be derived from the waste sulfite liquors discarded from the manufacture of cellulose pulp by the sulfite process.

The termiticide may be any of the common materials known to kill termites. Examples are the organic compounds creosote, pentachlorophenol, sodium pentachlorophenate, copper naphthenate, dichlorodiphenyl-trichloroethane, and the various halogenated polycyclic insecticides such as aldrin, chlordane, dieldrin, endrin, heptachlor, isodrin, lindane, as well as others such as the phosphorous compounds malathion, parathion. Examples of inorganic compounds include sodium fluoride, and sodium arsenate. The termiticide may also be a biologically active orgnic compound such as the bacterium *Serratia marcescens*, the mold *Aspergillus flavus*, and the fungus *Lentinus lepideus*.

The allurement may be only a small portion of the total composition, the remainder being an appropriate vehicle. The selection of a particular vehicle depends upon the mode of application desired and this, in turn, determines the physical form desired for the composition. The composition lends itself well to application as a dust, spray, and aerosol. For application as a dust, the composition is in dry powdered form with the usual inert powdered vehicle material such as, clay, talc, lime, pyrophyllite, and the like. For application by spraying, the composition must be in liquid form. The vehicle may be water or a suitable inert solvent to form a true solution or it may be a suspension preferably employing an emulsifying agent compatible with both the termiticide and the vanillin.

The amount of termiticide present in the final composition, of course, will depend upon the nature of the termiticide employed. It may range from as little as one-tenth percent to as much as 20% or more. The amount of vanillin employed is not particularly critical. It has been found that as little as 0.001% by weight of vanillin will suffice but more than 5% does not appear to have any greater beneficial result.

The figure illustrates apparatus for determining the affinity of termites for various compositions.

The apparatus of the figure is advantageously made of glass. In the embodiment herein, the apparatus is generally T shaped. The side arms 10 span a total length of twenty-four centimeters and have a diameter of one centimeter. The central opening 12 is for the addition of the termites. Washed and sterilized sand was added to the tube to function as a floor. A small roll of filter paper was inserted in each opening 13, 14 at the ends of the arms. Water was added to the filter paper at one end, and the test material was added at the other end. Termites were then added at the center opening. Periodic observations of the insects were made. Those termites in the left third of the tube were considered to be attracted to the material at the left end of the tube; those in the right third of the tube were considered to be attracted to the material at the right end of the tube; and the insects in the center third of the tube were not counted as preferring either material.

The invention will be illustrated further by the following examples.

*Example I*

An allurement was made by adding 0.1 gram of vanillin and 20.0 grams of sodium arsenate to a liter of water. To compare the preference of the termites to water only, which the termites need for life, to the allurement, the filter paper at the left end of the tube was wetted with water and the filter paper at the right end of the tube was wetted with the allurement. The preference of the termites as indicated by their position in the tube over a period of time after the addition of the termites is indicated below. (The data illustrates the average value obtained from carrying out the procedure several times.)

| Time | (Percent of Termites on—) | |
|---|---|---|
|  | Water Only | Allurement |
| 5 min | 12 | 44 |
| 10 min | 38 | 38 |
| 15 min | 12 | 44 |
| 30 min | 12 | 31 |
| 60 min | 0 | 69 |
| 2 hrs | 0 | 88 |
| 6 hrs | 0 | 100 |

*Example II*

As a control, the general test procedure of Example I was repeated. This time the filter paper at the left end was wetted with water, and the filter paper at the right end was wetted with a solution made by adding 20 grams of sodium arsenate to a liter of water. The results at various periods after the addition of the termites are as follows:

| Time | Water, percent | Arsenate Solution, percent |
|---|---|---|
| 5 min | 50 | 0 |
| 10 min | 38 | 12 |
| 15 min | 50 | 25 |
| 30 min | 50 | 0 |
| 60 min | 38 | 0 |

*Example III*

The general test procedure was repeated. The left filter paper was wetted with water, and the right filter paper was wetted with an extract of the fungus *Lenzites trabea*, a well-known attractant for termites. The results for periods of time after the addition of the termites are illustrated below:

| Time | Water Only, percent | Extract +Water, percent |
|---|---|---|
| 5 min | 12 | 0 |
| 10 min | 50 | 25 |
| 15 min | 38 | 25 |
| 30 min | 62 | 12 |
| 60 min | 12 | 25 |

*Example IV*

The general test procedure was repeated except that the left filter paper was wetted with water while the right filter paper remained dry. The results after various periods of time after the addition of the termites are illustrated below:

| Time | Water Only, percent | Dry Paper, percent |
|---|---|---|
| 5 min | 38 | 0 |
| 10 min | 50 | 0 |
| 15 min | 63 | 0 |
| 30 min | 25 | 0 |
| 60 min | 28 | 0 |
| 2 hrs | 50 | 0 |

In each of the foregoing tests, eight termites were carefully placed in the center of the test apparatus. These termites were eastern subterranean termites (*Reticulitermes flavipes* (Kollar). Similar results were obtained with other termites, for example *R. virginicus* (Banks).

*Example V*

A typical formulation was made as follows:

|  | Percent |
|---|---|
| Sodium fluoride | 75 |
| DDT | 5 |
| Chlordane | 2 |
| Vanillin | 1 |
| Pyrethrins | 0.1 |
| Inert (clay) | 16.9 |

The general test procedure followed above was repeated except that the left filter paper was wetted while the right filter paper was wetted and dusted with the foregoing composition. Ten termites were placed in the center of the test apparatus. At the end of five minutes, half the termites were on the poisonous side of the test apparatus. At the end of half an hour, two termites were dead, and five termites were living at the right-hand end of the tube. At the end of an hour, all ten termites were at the right-hand end of the test apparatus and were either dead or moribund.

The foregoing has provided a novel allurement for termites. In accordance with this invention, the allurement can provide a chemical or biological barrier with the assurance that the termites will be drawn to the barrier and thereby be destroyed.

I claim:

1. An allurement composition for providing a barrier to which termites will be drawn and thereby be destroyed consisting essentially of vanillin and a termiticide as active ingredients.

2. An allurement composition for providing a barrier to which termites will be drawn and thereby be destroyed consisting essentially of from 0.0001 to 5.0% by weight of vanillin and a termiticide as active ingredients.

3. An allurement composition for providing a barrier to which termites will be drawn and thereby be destroyed comprising:

|  | Percent |
|---|---|
| Sodium fluoride | 75 |
| DDT | 5 |
| Chlordane | 2 |
| Vanillin | 1 |
| Pyrethrins | 0.1 |
| Inert (clay) | 16.9 |

4. A method of providing a barrier for termites which comprises treating the area susceptible of infestation by termites with the composition of claim 1.

References Cited by the Examiner

UNITED STATES PATENTS

| 1,540,649 | 6/1925 | Power | 167—48 |
| 3,070,495 | 12/1962 | Esenther et al. | 167—48 |

OTHER REFERENCES

Hanna: Handbook of Agricultural Chemicals, published by L. W. Hanna, Rt. 1, Box 210, Forest Grove, Oregon, 2nd ed. (1958); S–585H22, pages 216, 277, 320, and 328.

Miller: "The Pfizer Handbook of Microbial Metabolites," McGraw-Hill Book Company, Inc., New York, 1961, pp. 24, 284–286, 452–453 and 496–599.

JULIAN S. LEVITT, *Primary Examiner*.

D. B. MOYER, GEORGE MENTIS,
*Assistant Examiners.*